United States Patent
Mayhew et al.

(10) Patent No.: US 7,447,208 B2
(45) Date of Patent: Nov. 4, 2008

(54) CONFIGURATION ACCESS MECHANISM FOR PACKET SWITCHING ARCHITECTURE

(75) Inventors: David E. Mayhew, Northborough, MA (US); Todd R. Comins, Chelmsford, MA (US); Lynne M. Brocco, Cambridge, MA (US); Joseph A. Schaefer, Chandler, AZ (US); Gary A. Solomon, Acton, MA (US); Edward Butler, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1010 days.

(21) Appl. No.: 10/746,043

(22) Filed: Dec. 23, 2003

(65) Prior Publication Data

US 2005/0041658 A1  Feb. 24, 2005

Related U.S. Application Data

(60) Provisional application No. 60/493,113, filed on Aug. 4, 2003.

(51) Int. Cl.
*H04L 12/28* (2006.01)
*H04J 3/24* (2006.01)

(52) U.S. Cl. .................................. 370/392; 370/474
(58) Field of Classification Search ......... 370/229–235, 370/252–253, 412–418, 392, 474; 709/249, 709/233; 710/128
See application file for complete search history.

(56) References Cited

U.S. PATENT DOCUMENTS 6,098,110 A * 8/2000 Witkowski et al. .......... 709/249

* cited by examiner

*Primary Examiner*—Andrew Lee
(74) *Attorney, Agent, or Firm*—Blakely, Sokoloff, Taylor & Zafman LLP

(57) ABSTRACT

A method for accessing a configuration space of a device is described. The method includes setting a first field of a packet to a value to specify a destination device, and setting a second field of the packet to a defined value to indicate that the packet is a configuration access packet. The method further includes setting a third field of the configuration access packet to a value to select one of a plurality of configuration apertures of a configuration space of the destination device, and setting a fourth field of the configuration access packet to a value to address a specific memory location within the selected aperture.

21 Claims, 6 Drawing Sheets

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Last Dword Byte Disable Mask | | | | First Dword Byte Disable Mask | | | | Dwords Requested | | | | MBO | CRC | Transaction Number | | | | | | | | | | | | | | | | | Type (0) |
| 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 |
| Offset [31:2] | | | | | | | | | | | | | | | | | | | | | | | | | | | | | | | |
| LRF Page Index | | | | | | | | | | | | | | | | Reserved | | | | | | | | | | | | | | | |

| 31 | 30 29 | 28 27 26 25 | 24 | 23 22 21 20 | 19 18 | 17 16 15 14 13 | 12 11 10 9 8 7 6 5 4 3 2 | 1 0 |
|---|---|---|---|---|---|---|---|---|
| R | TT | Reserved | TTF | Payload Dwords | MBO / CRC | Transaction Number | LRF Page Index / Must Be 0 | Type (1) |

FIG. 5B

| 31 | 30 29 | 28 27 26 25 | 24 | 23 22 21 20 | 19 18 | 17 16 15 14 13 | 12 11 10 9 8 7 6 5 4 3 2 | 1 0 |
|---|---|---|---|---|---|---|---|---|
| R | TT | Reserved | TTF | Completion Status | MBO / CRC | Transaction Number | LRF Page Index / Must Be 0 | Type (1) |

FIG. 6

| 7 | 6 | 5 | 4 | 3 | 2 | 1 | 0 | | |
|---|---|---|---|---|---|---|---|---|---|
| | | | | | | 1 | 0 | Type (2) | 32 |
| | | | | | 2 | | | | 33 |
| | | | | 3 | | | | | 34 |
| | | | 4 | | | | | Reserved | 35 |
| | | 5 | | | | | | | 36 |
| | 6 | | | | | | | | 37 |
| 7 | | | | | | | | | 38 |
| | | | | | | | 0 | | 39 |
| | | | | | | 1 | | | 40 |
| | | | | | 2 | | | LRF Page Index | 41 |
| | | | | 3 | | | | | 42 |
| | | | 4 | | | | | | 43 |
| | | 5 | | | | | | | 44 |
| | 6 | | | | | | | | 45 |
| 7 | | | | | | | | | 46 |
| | | | | | | | 0 | Transaction Number | 47 |
| | | | | | | 1 | | | 48 |
| | | | | | 2 | | | | 49 |
| | | | | 3 | | | | MCBO CRC | 50 |
| | | | 4 | | | | | | 51 |
| | | 5 | | | | | | Payload Dwords | 52 |
| | 6 | | | | | | | | 53 |
| 7 | | | | | | | | | 54 |
| | | | | | | | 0 | | 55 |
| | | | | | | 1 | | | 56 |
| | | | | | 2 | | | First Byte Mask | 57 |
| | | | | 3 | | | | | 58 |
| | | | 4 | | | | | | 59 |
| | | 5 | | | | | | Last Byte Mask | 60 |
| | 6 | | | | | | | | 61 |
| 7 | | | | | | | | | 62 |
| | | | | | | | | | 63 |

Offset [31:2]

CONFIGURATION ACCESS MECHANISM FOR PACKET SWITCHING ARCHITECTURE

RELATED APPLICATION

This application claims the benefit of the earlier filing date of U.S. Provisional Patent Application No. 60/493,113, filed Aug. 4, 2003.

BACKGROUND

1. Field

Embodiments of the invention relate to the field of computer systems, and more specifically, to the field of device configuration for computer systems.

2. Background

Devices and subsystems of a computer system may have configuration registers that may be accessed or programmed prior to or during the operation of the computer system. Conventional computer systems typically implements configuration registers that have limited space. For example, conventional Peripheral Component Interconnect (PCI) architecture limits a configuration register space available on a given device to, for example, 256 bytes. PCI Express Base architecture, as defined in a PCI Express Base Specification Revision 1.0 dated Jul. 22, 2002 by the PCI-SIG (Peripheral Component Interconnect—Special Interest Group), extended the available configuration register space of a given device to 4 kilobytes. Even with an increased configuration space of up to 4 kilobytes, Advanced Switching (AS) architecture requires more scalability especially when dealing with multi-ported switch devices given Advanced Switching's uni-function device configuration model. As a result, the configuration register space limitation burdens PCI and PCI Express Base architecture.

Additionally in PCI and PCI Express Base architecture there is, in many cases, potentially a necessary split between configuration mechanism that must be used to work around the configuration space limitations mentioned above. For example PCI and PCI Express Base components, if needed, must request additional internal configuration register, or table space by requesting a memory, or I/O (input/output) mapped space. As a result, to fully configure a PCI or PCI Express Base component of this type, some of the component set up may require using configuration transactions, while other elements may require set up using either memory or I/O transactions.

BRIEF DESCRIPTION OF THE DRAWINGS

The invention is illustrated by way of example and not by way of limitation in the Figures of the accompanying drawings in which like references indicate similar elements. It should be noted that the references to an or one embodiment of this disclosure are not necessarily to the same embodiment, and such references mean at least one.

FIG. 4 illustrates a configuration read packet header according to one embodiment.

FIGS. 5A and 5B illustrate configuration read completion packet headers according to one embodiment.

FIG. 6 illustrates a configuration write packet header according to one embodiment.

DETAILED DESCRIPTION

In the following description, specific details are set forth. However, it is understood that embodiments may be practiced without these specific details. In other instances, well-known circuits, structures and techniques have not been shown in detail to avoid obscuring the understanding of this description.

Figure 1:
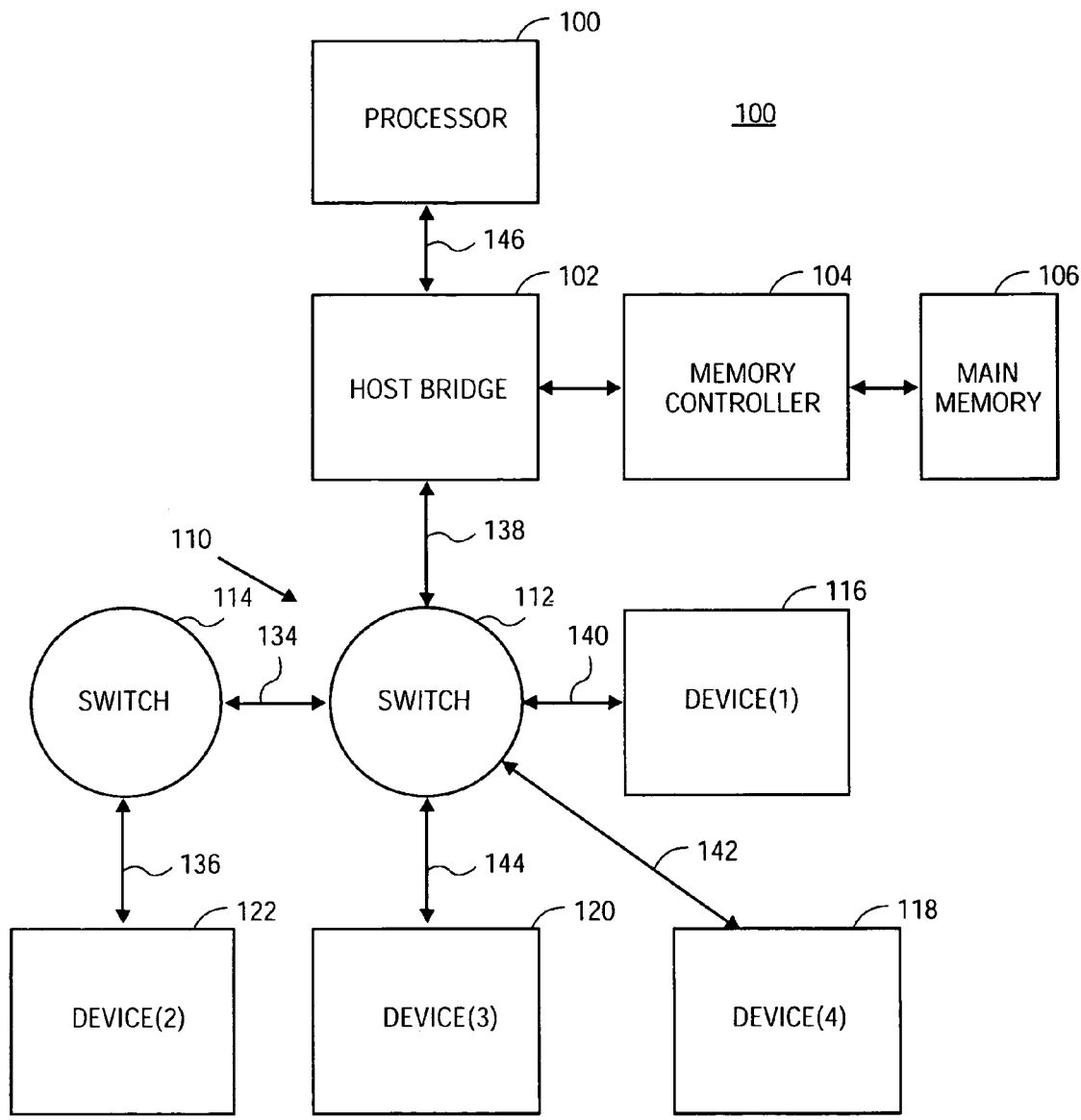
FIG. 1 illustrates a block diagram of one embodiment of a computer system in which the invention may be implemented.

FIG. 1 illustrates one embodiment of computer system 100 in which the invention may be implemented. System 100 includes processor 101, processor bus 146, memory controller 104 and main memory 106. Processor 101 may comprise any suitable processor, such as a processor from the Pentium™family of processors available from Intel Corporation of Santa Clara, Calif. Alternatively, other processors may be used. System 100 may include one or more processors. Although described in the context of system 100, embodiments of the invention may be implemented in any suitable computer system comprising any suitable combination of integrated circuits.

Also included in system 100 is host bridge 102 coupled to processor bus 146 and switch fabric 110. Host bridge 102 may include any suitable interface controllers to provide for any suitable communication link to processor bus 146 and/or the devices coupled via switch fabric 110. In one embodiment, switch fabric 110 is Advanced Switching (AS) fabric having features for PCI Express Base architecture, as defined by PCI Express Base specification. Switch fabric 110 includes one or more switches 112, 114, which control data path between various devices of the computer system. Each switch may include a number of ports, each port capable of connecting to another switch or a device within the system or network.

A number of devices may be connected to the switches 112, 114 via fibers (or links). A fiber is a bi-directional communication path or a pair of uni-directional communication paths between two connect points (e.g., switches and endpoint devices) in a computer system or network. In the illustrated system 100, fabric 110 includes a first switch 112 coupled to host bridge 102, device(1) 116, device(4) 118, device(3) 120 and switch 114 via five separate switching fibers 138, 140, 142, 144, 134, respectively. The second switch 114 is coupled to switch 112 and device(2) 122 via two separate switching fibers 134, 136, respectively. Devices(1)-(4) may be processing elements or may be any device from which a transaction originates or terminates.

For one embodiment, configuration access packets may be transferred between any two suitable devices of system 100. For example, system 100 may enable a requesting device, such as processor 101 to generate and transmit a configuration access packet to any one of devices (1)-(4), etc via switches 112 and 114. The configuration access packet may be used by a requesting device to gain access to a configuration space of a destination device.

Figure 2:
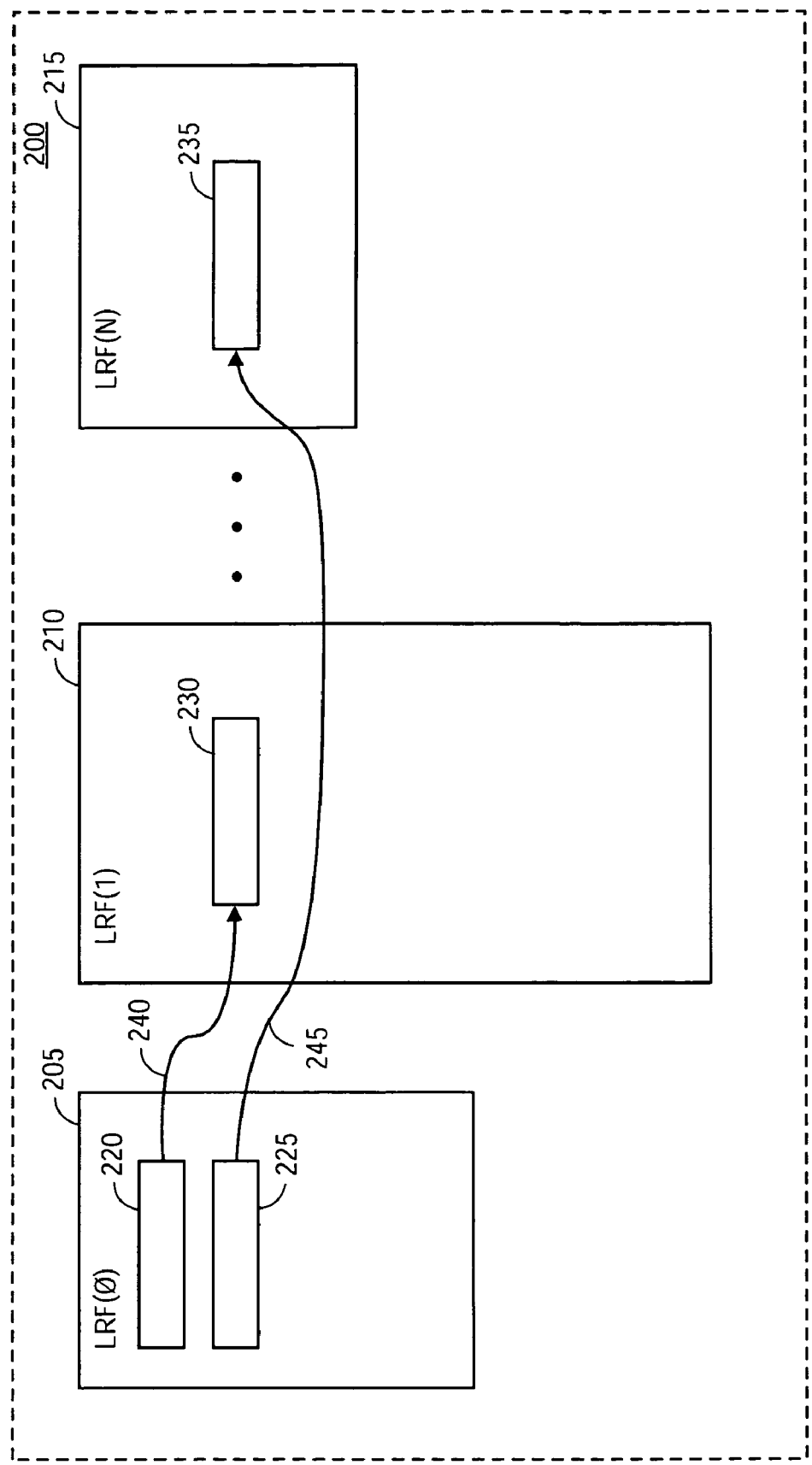
FIG. 2 illustrates a configuration space of a device according to one embodiment.

FIG. 2 illustrates configuration space 200 of a device according to one embodiment. The device implementing the configuration space may be any device incorporated within a computer system or network, such as, for example, microprocessor, storage device, input/output (I/O) device, or switch. Configuration space 200 is divided into a number of configuration pages 205, 210 and 215 referred to as. The terms "page" and "aperture" in this context are used to described a block of memory that enables a device to distinguish one set of information from another.

In accordance with one embodiment, configuration space 200 of a device may be organized in a number of different ways. Additionally, each device may segregate information into different configuration apertures in a number of different ways. According to one embodiment, each aperture may vary in memory size. In one implementation, the configuration space is organized such that each LRF can be expanded up to four gigabytes in memory size.

As shown in FIG. 2, the illustrated configuration space 200 includes a number of configuration apertures, which are indexed as Aperture(0) through Aperture(N). In one implementation, configuration space 200 of a device may define up to sixteen apertures. It should be understood that the number of configuration apertures included in a configuration space is an implementation choice and could be any number of apertures (e.g., 2, 4, 8, 32, etc).

In should be noted that such configuration space arrangement using a configuration space divided into a number of separate apertures provides a scalable configuration space, in which each separate configuration aperture may be accessed using an index scheme. Such configuration space arrangement eliminates a fundamental configuration register space limitation that burdens PCI and PCI Express Base architecture implementations.

As shown in FIG. 2, configuration apertures (Apertures 205, 210 and 215) may have entries 220, 225, 230 associated with pointers 240, 245 that point to a particular location within the same aperture or a particular location within other apertures. The location pointed to by the pointer may contain various information relating to a given device (e.g., functionality and/or capabilities of the device).

In one embodiment, a configuration space of a device is set up such that the first configuration aperture is indexed Aperture(0). Aperture(0) may contain basic information (e.g., configuration settings, functionality and/or capabilities of the device) about the device and may also contain information necessary for understanding how the remaining portion of the configuration space is organized. Accordingly, if a device, such as a processor, is trying to identify what kinds of devices are attached to the switch fabric, the processor can access Aperture(0) of each of the attached devices to obtain basic information about the attached devices and to figure out how the remaining portion of the configuration space is organized.

In accordance with one embodiment, a configuration space of a device may be set up such that it can restrict access on a aperture-by-aperture basis. Access rights may be assigned to enable other devices to access the configuration space on a aperture-by-aperture basis. By assigning access rights to each individual aperture, the system can control which device has access to each aperture and which device has the ability to alter the information contained in each aperture. For example, the configuration space may be configured such that a set of devices can read the entire configuration space while another set of devices can only read certain apertures of the configuration space. Additionally, the configuration space may be configured such that some devices can read from the entire configuration space but can only write to a portion of the configuration space.

Figure 3:
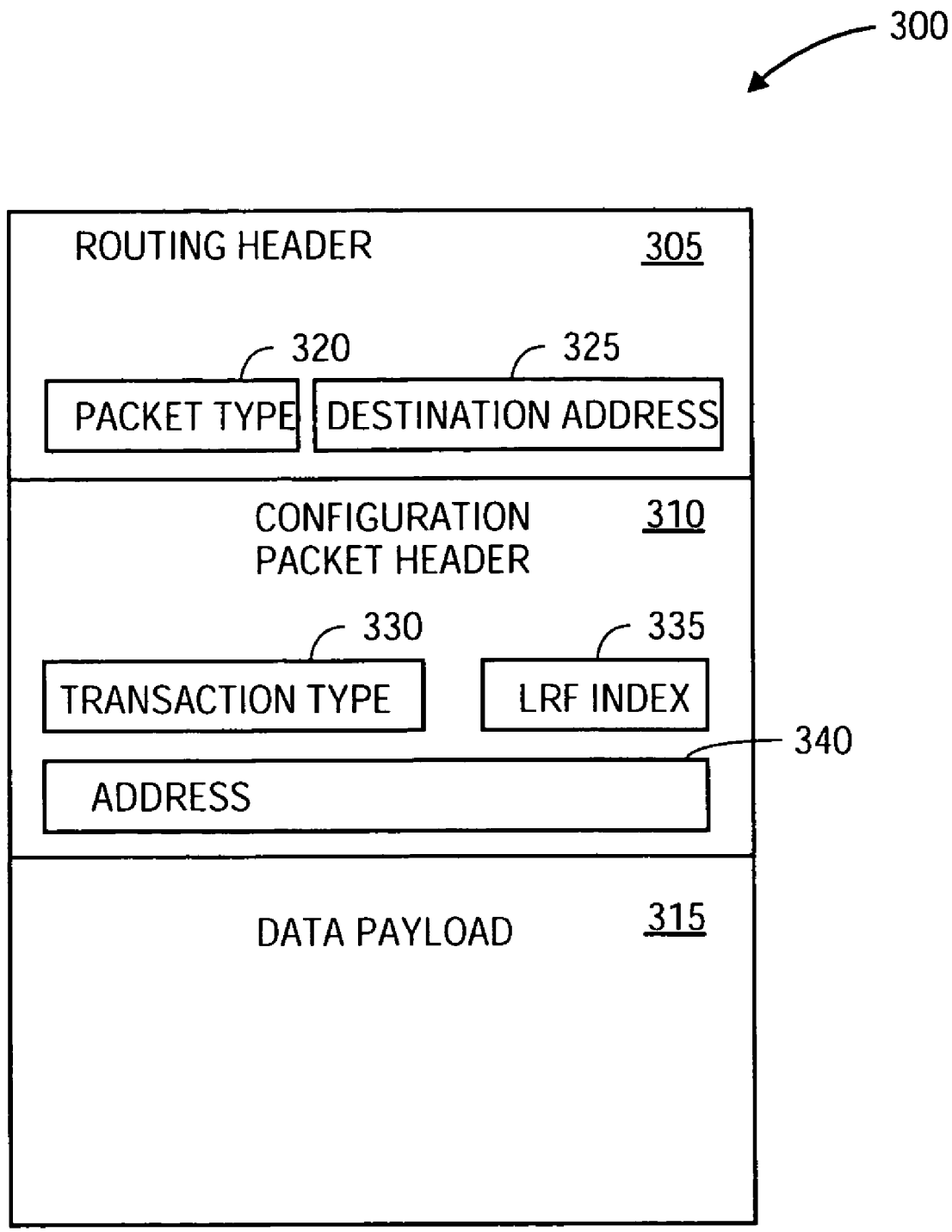
FIG. 3 illustrates a simplified representation of a configuration packet according to one embodiment.

FIG. 3 illustrates a simplified representation of packet 300, according to one embodiment, transmitted from one device to another via a switch fabric. Packet 300 may include routing header 305, configuration packet header 310 and data payload 315. In one embodiment, routing header 305 includes, among other things, destination address field 325 to identify the destination device and packet type field 320 that indicates the type of packet. For example, when packet type field 320 is encoded as a certain value (e.g., 4), this indicates that the packet is formatted for access to a configuration space of a destination device. Accordingly, when packet type field 320 is encoded as the value (e.g., 4), the packet will be used by the destination device to enable access to its configuration space.

More specifically, when a packet has reached its destination, the destination device will examine a second header 310 immediately following routing header 305 to determine what is being requested by packet 300. When the packet indicates that it is of configuration access type designated by the packet type field, the header immediately following routing header 305 will be configuration packet header 310 formatted to access a configuration space of a destination device.

As shown in FIG. 3, configuration packet header 310 includes, among other things, transaction type field 330 that indicates what type of transaction (e.g., read request, read completion and write request) is being requested by the packet. Additionally, configuration packet header 310 includes, aperture index 335 field, which is used to specify which one of the apertures within the configuration space of the destination device, and address field 340 (e.g., 32-bit), which is used to point to a specific memory location within the specified aperture.

If transaction type field 330 indicates that the packet is a configuration write request, the destination device may take data payload 315 and write to a specific configuration aperture specified by aperture index 335 and to a specific location within the configuration space specified by address field 340. If transaction type field 330 indicates that the packet is a configuration read request, the destination device may generate a read completion packet to return the data specified by aperture index 335 and a specific location within the configuration space specified by the value set in address field 340.

Configuration access packets for accessing a configuration space of a given device are described in more detail with reference to FIGS. 4-6. In one embodiment, configuration access packets are used to access a configuration space that is divided into a number of segregated apertures. In the embodiment shown in FIGS. 4-6, configuration access packets include 4-bit field to access up to sixteen different apertures of a given device. Additionally, in the embodiment shown in FIGS. 4-6, configuration access packets includes 32-bit address field to reference up to 4 gigabytes of configuration space with a given aperture.

In accordance with one embodiment, by providing a configuration space with a number of segregated apertures, each aperture accessed using 32-bit addressing, the configuration access mechanism provides an access to a relatively large amount of configuration space that a requesting device can address.

In one embodiment, read requests are transferred between two devices using a split transaction protocol. For split transaction protocol, there are two types of read packets: read request packet and read completion packet. Read request packets are used to initiate read transactions. Read completion packets are used to return read data. Read completion packets are associated with their corresponding read request packets by transaction numbers. In one embodiment, because PI-4 is defined as a memory mapped load/store transport service there are no responses to configuration write packets.

FIG. 4 illustrates a format for a configuration read request packet header according to one embodiment. In one embodiment, the illustrated read request packet header is used to read information from configuration space of Advanced Switching (AS) device. In the illustrated embodiment, the configuration read request packet header is eight bytes. The fields of the configuration read request packet header, shown in FIG. 4, are described in Table 1.

TABLE 1

Configuration Read Completion Packet Header Fields

| Field Name | Description |
| --- | --- |
| Transaction Number | The transaction number field contains a tag number for the completion. This field allows completions to be matched with requests. |
| Request Code | This field indicates the number of 32-bit data values requested a byte mask as indicated by the Request Scale field. |
| Operation Type | This field indicates the type of packet. In one embodiment. Read Request packets are identified with a value of 4. |
| Request Scale | This field selects how the Request Code field will be interpreted for this operation.<br>0: indicates that Request Code contains a byte mask.<br>1: indicates that Request Code contains the number of 32-bit data values to be read. |
| Offset [31:2] | This field provides the offset (address) of the requested data relative to Aperture Index. |

FIGS. 5A and 5B illustrate a format for configuration read completion packet headers according to one embodiment. In one embodiment, the read completion packet headers are used to read information from configuration space of Advanced Switching (AS) device. In the illustrated embodiment, the configuration read completion packet headers are each four bytes.

In accordance with one embodiment, there are two different types of configuration read completion packet headers. When the configuration read is successful, the Operation Type (OT) field will indicate that this is a Read Completion with Data packet. In this case, the configuration read completion packet will contain read data that is returned from the destination device to the requesting device. And the number of 32-bit data values contained in the packet's payload may be determined by examining the Payload Size field, as shown in FIG. 5A. When the configuration read in unsuccessful, the Operation Type (OT) field will indicate that this is a Read Completion with Error Status packet. In this case the completion status field will contain some error status value that is not related to requested read size, as shown in FIG. 5B. The fields of the configuration read completion packet headers, shown in FIGS. 5A and 5B, are described in more detail in Table 2.

TABLE 2

Configuration Read Request Packet Header Fields

| Field Name | Description |
| --- | --- |
| Aperture Index | This field indicates the configuration page for the associated access. |
| Transaction Number | The Transaction Number field contains a tag number for the completion. This field allows completions to be matched with requests. |
| Payload Size (ref. FIG. 5A) | This field indicates the number of 32-bit data values returned in the Read Completion with Data packet. |
| Request Code (ref. FIG. 5B) | This field indicates the error status value for the Read Completion with Error Status packet. |
| Operation Type | This field indicates the type of packet. In one embodiment Read Completion with Data packets are indentified with a value of 5 and a Read Completion with Error Status packet are indentified with a value of 7. |

FIG. 6 illustrates a format for a Configuration Write packet header according to one embodiment. In one embodiment, the write packet header is used to configure Advanced Switching (AS) device. In the illustrated embodiment, the configuration write packet header is eight bytes. For write type requests, the configuration access packet may have associated data attached to the configuration write packet header. The fields of the configuration write packet header, shown in FIG. 6, are described in Table 3.

TABLE 3

Configuration Write Packet Header Fields

| Field Name | Description |
| --- | --- |
| Aperture Index | This field indicates the configuration page for the associated access. |
| Transaction Number | The Transaction Number field contains a tag number for the completion. This field allows completions to be matched with requests. |
| Payload Size | This field indicates the number of 32-bit data values appended to the Write Request Data packet. |
| Operation Type. | This field indicates the type of packet. In one embodiment Write Request packets are identified with a value of 0. |
| First Byte Mask (FBM) | This field selects how the first 32-bit of payload will be interpreted for this operation. 0: indicates that all bytes of the Payload are valid. 1: indicates that the least significant byte of payload contains byte masking information. |
| Offset [31:2] | This field provides the offset (address) of the requested data relative to Aperture Index. |

FIGS. 4-6 illustrates an exemplary configuration access packet header using (1) 4- bit indexing to enable selection of up to sixteen configuration pages specified by the value set in the Aperture Index field, and (2) 32-bit addressing to address a specific memory location within the selected page specified by the value set in the offset (address) field. It should be understood that embodiments of the invention can be implemented with different Aperture Index field size and different offset (address) field size.

In operation, a requesting device, such as a processor may initiate a configuration access packet by encoding various information in a suitable format as specified in Tables 1-3. The configuration access packet may be generated by (1) setting a destination address field, in the routing header of the packet, to a value in order to specify the destination device, (2) setting a packet type field, in the routing header of the packet, to a defined value to indicate that the packet is a configuration access packet, (3) setting an Aperture Index field, in the configuration packet header, to select one of configuration apertures of a configuration space of the destination device, and (4) setting an address field, in the configuration packet header, to address a specific memory location within the selected configuration aperture. Once the requesting device has generated the configuration access packet, the configuration access packet is transferred from the requesting device to the destination device via buses and/or switch fiber.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
setting a first field of a packet to a value to specify a destination device;
setting a second field of the packet to a defined value to indicate that the packet is a configuration access packet;
setting a third field of the configuration access packet to a value to select one of a plurality of configuration apertures of an expanded configuration register space of the destination device; and
setting a fourth field of the configuration access packet to a value to address a specific memory location within the selected configuration aperture to configure the destination device
and transmitting the configuration access packet from a requesting device to the destination device specified by the value set in the first field of the configuration access packet.

2. The method of claim 1, further comprising:
receiving the configuration access packet;
determining which one of the configuration apertures of a memory-mapped configuration register space is being selected by the configuration access packet; and
determining a specific address within the selected configuration aperture accessed by the configuration access packet.

3. The method of claim 1, wherein the third field is specified using a 4-bit indexing to enable selection of up to sixteen configuration apertures of the destination device.

4. The method of claim 1, wherein the fourth field is specified using 32-bit addressing to address up to four gigabytes of memory space within the selected configuration aperture of a memory-mapped configuration register space.

5. The method of claim 1, further comprising:
generating a configuration read access packet using a split transaction protocol which includes (1) a configuration read request packet to initiate configuration read transactions, and (2) a configuration read completion packet to return configuration read data.

6. The method of claim 5, further comprising:
associating the configuration read completion packet with the corresponding configuration read request packet using a transaction number specified in the configuration packet header.

7. A system comprising:
a device having a memory-mapped configuration register space which is divided into a plurality of configuration pages; and
a processor coupled to the device, the processor to generate a configuration packet to access the memory-mapped configuration register space of the device, wherein the configuration packet includes (1) first configuration information to select one of the configuration pages of the memory-mapped configuration register space, and (2) second configuration information to address a specific location within the selected configuration page to configure the device.

8. The system of claim 7, wherein the configuration packet includes a routing header and a configuration packet header.

9. The system of claim 8, wherein a first value in a first control field of the routing header indicates that the packet is a configuration space access.

10. The system of claim 7, wherein the first configuration information is specified using 4-bit value to enable selection of up to sixteen configuration pages of the device.

11. The system of claim 7, wherein the second configuration information is specified using 32-bit addressing to address up to four gigabytes of memory space within a selected configuration aperture of an expanded configuration register space.

12. The system of claim 8, wherein the processor is configured to generate configuration read access packets using a split transaction protocol which includes (1) configuration read request packets to initiate configuration read transactions, and (2) configuration read completion packets to return configuration read data.

13. The system of claim 12, wherein a configuration read completion packet is associated with a corresponding configuration read request packet by a transaction number specified in the configuration packet header.

14. The system of claim 7, wherein the processor is configured to generate a configuration write packet having a routing header, a configuration packet header and a data payload.

15. A configuration access mechanism comprising:
a first logic to generate a configuration packet to access a memory-mapped configuration register space which is divided into a plurality of configuration apertures, wherein the configuration packet includes (1) first configuration information to select one of the configuration apertures of the memory-mapped configuration register space, and (2) second configuration information to address a specific location within the selected configuration aperture; and
a second logic to process a configuration packet received (1) to determine which one of the configuration apertures is being selected by the configuration packet and (2) to determine a specific address within the selected configuration aperture being accessed by the configuration packet to configure a destination device.

16. The configuration access mechanism of claim 15, wherein the configuration packet includes a routing header and a configuration packet header, and wherein a first control field in the routing header having a first value indicates that the packet is a configuration space access.

17. The configuration access mechanism of claim 15, wherein the first configuration information is specified using a plurality of bits to enable selection of any one of the plurality of configuration apertures of the first device.

18. The configuration access mechanism of claim 15, wherein the second configuration information is specified using 32-bit addressing.

19. The configuration access mechanism of claim 15, wherein the first logic is configured to generate configuration read access packets using a split transaction protocol which includes (1) configuration read request packets to initiate configuration read transactions, and (2) configuration read completion packets to return configuration read data.

20. The configuration access mechanism of claim 19, wherein a configuration read completion packet is associated with a corresponding configuration read request packet by a transaction number specified in the configuration packet header thereof.

21. The configuration access mechanism of claim 18, wherein the first logic is configured to generate a configuration write packet having a routing header, a configuration packet header and a data payload.

* * * * *